Patented Aug. 7, 1945

2,381,732

UNITED STATES PATENT OFFICE 2,381,732

METHOD FOR THE RECOVERY OF ESSENTIAL OILS

James A. Finley, Ontario, Calif., assignor to California Fruit Growers Exchange, Los Angeles, Calif., a corporation of California Application February 9, 1942, Serial No. 430,094

9 Claims. (Cl. 260—236.6)

This invention relates to a method for the recovery of essential oils from plant materials and, more particularly, relates to the recovery of essential oils from citrus fruits.

It is an object of this invention, therefore, to disclose methods and means for the treatment of plant materials for the purpose of recovering essential oils therefrom.

Another object of this invention is to disclose methods and means for the treatment of citrus fruit for the purpose of recovering the essential oils present therein.

These and other objects, uses, and advantages, and adaptations of the invention will be apparent from the several illustrative forms of the invention hereinafter disclosed.

I attain the above and other objects and advantages in the process or processes illustrated in the accompanying drawings, in which.

The apparatus comprises broadly means for removing juice from the material being treated, means for applying the treating materials to the peel, and means for extracting the essential oils from the treated material.

Figure 2:
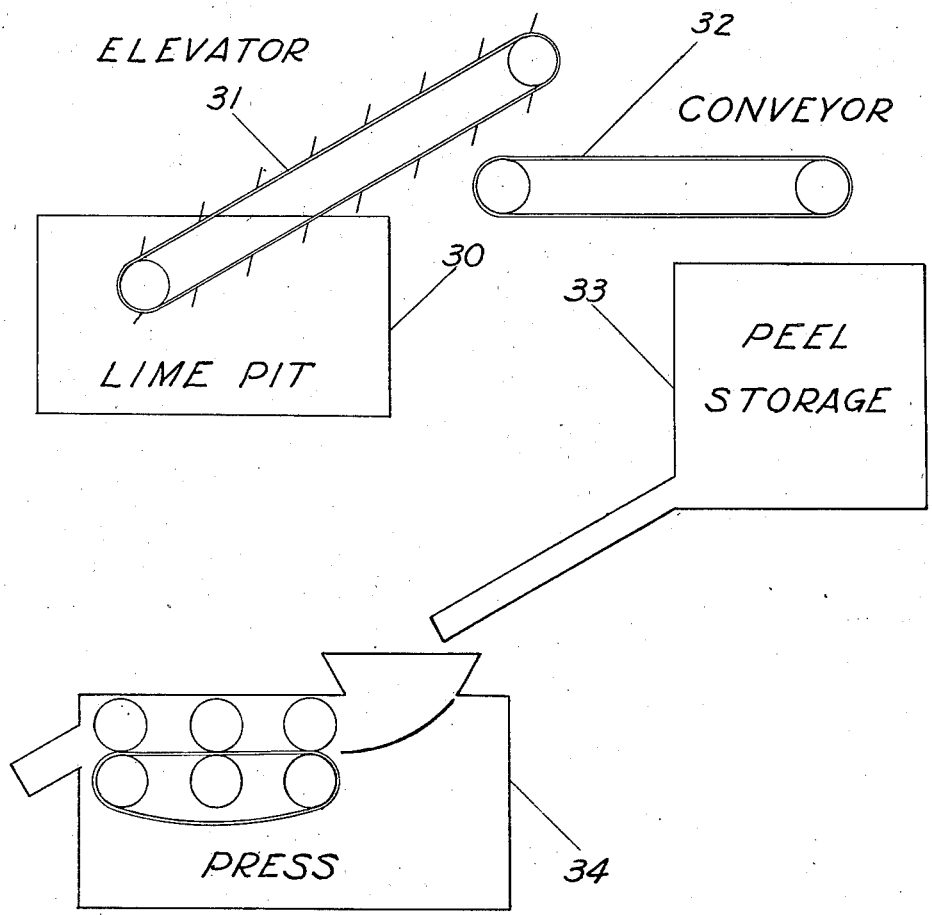
Figure 2 represents schematically a commercial application of my process.

The apparatus diagrammed in Figure 2 omits any juice-separating means, since it is intended to operate on peel, rather than on whole fruit.

Figure 1:
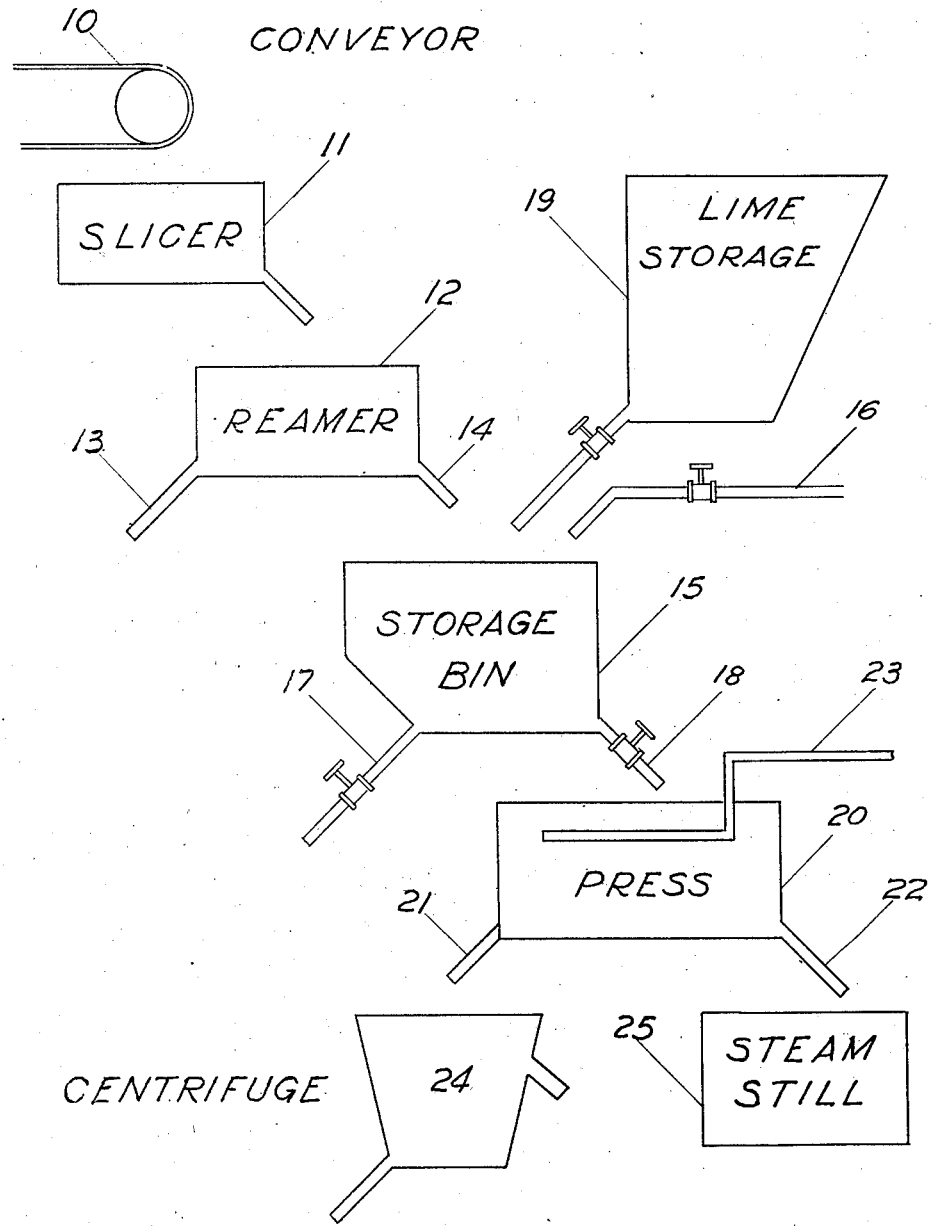
Figure 1 represents a flow sheet of my process or processes, wherein the apparatus is schematically shown.

The means shown in Figure 1 for carrying out my invention are identified as follows: a fruit conveyor 10; a slicer 11; a reamer 12, having a juice outlet at 13 and a peel outlet at 14; a storage bin 15; the storage bin 15 having a water intake at 16 and an outlet at 17, with peel outlet at 18; a lime storage bin 19; a press 20, the press 20 having a liquid outlet at 21 and peel outlet at 22; water spraying means at 23; a centrifuge 24; and a steam still 25. Shown in Figure 2 are: lime pit 30 for receiving the peel; elevator 31 and conveyor 32 for distributing the limed peel to tanks 33; and press 34 for removing the oil from the peel.

This invention is based upon the discovery that it is possible to increase the yield of essential oils from such source materials as, for example, citrus fruits, by treating the source material in accordance with the disclosures appearing hereinafter.

Up to the present time, the methods employed for the recovery of essential oils from such source materials as citrus fruit have been successful in recovering only a small percentage of the oil actually present in the source material. One method employed for the recovery of the essential oils from citrus fruit involves comminuting the whole fruit by various means, as, for example, a screw press or rolls, thereby rupturing the oil cells on the surface of the fruit and consequently liberating the oil contained therein. In this process a portion of the oil becomes emulsified with the juice, from which it is separated by means of a high-speed centrifuge. Another method involves pricking the rind of the fruit for the purpose of puncturing the oil cells. Subsequently, the liberated oil is washed from the surface of the fruit by means of water sprays, and oil separated from the resulting emulsion by various means.

It has been my observation that, whereas a ton of oranges, for example, may contain from 10 to 15 pounds of oil, the oil actually recovered by the usual processes wherein heat is not employed seldom exceeds three pounds per ton and then only under the most favorable conditions, as when the fruit has undergone frost damage. The average recovery, by cold process means, of the essential oil of orange from whole oranges probably does not exceed 1½ to 2 pounds of oil per ton (3 to 4 pounds per ton on basis of half-shells), and the average recovery of lemon oil from lemons probably does not exceed seven pounds per ton of half-shells.

Although essential oils and particularly citrus oils may be recovered by steam distillation as well as by other means, the discussion hereinabove relates to "cold" processes for the recovery of the oil. By the term "cold process" as used herein, I refer to those processes for the recovery of essential oils which do not employ a temperature above atmospheric.

Apparently, one of the chief difficulties in the cold process recovery of citrus oils, for example, has been the fact that in the usual processes the oil is forced into association with the juice of the fruit which contains pectin, an excellent emulsifying agent. Other carbohydrate-like materials present in the juice tend to increase the oil-holding capacity of the juice by affording large surfaces over which a thin film of the oil quickly spreads and from which it is practically impossible to be separated. Another loss of oil is caused by absorption in the albedo layer of the peel.

I have now found that the recovery of essential oils from such source materials as citrus fruits may be increased from 100 to 400% over the recovery obtained by the usual processes mentioned hereinbefore by proceeding in accordance with the disclosures appearing hereinafter.

Broadly, my method comprises cutting the fruit in half and reaming or burring the juice therefrom in the usual manner, care being exercised so as to rupture as few of the oil cells as possible. The reamed half-shells are then treated with an alkalizing material and stored in the presence of this material for a sufficient length of time and in the presence of naturally occurring enzymes to convert the pectic constituents of the half-shells into other forms. In order to obtain this conversion of the pectic materials it is necessary that conditions be obtained whereby the naturally occurring enzymes present in the peel react promptly. The action of the enzymes in the presence of the alkalizing material as, for example, hydrated lime, is ordinarily evidenced by hardening of the peel. The conversion of the pectic material which takes place tends to destroy the emulsifying properties of the pectic and other carbohydrate-like materials so that in the subsequent steps of my process little difficulty is encountered due to emulsification of oil and water. Also the hardened albedo absorbs less of the oil during pressing.

In one embodiment of my invention I may work with citrus fruit, as for example, oranges.

Oranges are conveyed along the fruit conveyor 10 to the slicer 11 where they are cut in half. From the slicer the halved oranges are discharged to a reamer 12 where the juice is reamed from the fruit and discharged through the juice outlet 13. The reamed half-shells are discharged at the outlet 14 to a storage bin 15. A controlled amount of lime from the lime storage bin 19 and water from the water intake 16 are added to the storage bin 15. After storage the half-shells are transported to the press 20, which is preferably, though not necessarily, of the belt and roller type. During the pressing fresh or limed water may be conveniently sprayed over the half-shells from the water spraying means 23. The liquid draining from the press at 21 is passed to a high-speed centrifuge 24, wherein the oil is separated from the water. It may be found desirable to run the liquid draining from the press at 21 to a storage tank in order to allow a preliminary separation of the oil from the water. The oil layer may then be decanted and passed through the centrifuge. Such a step has the advantage of providing a constant feed for the centrifuge, as well as providing a feed which is comparatively high in oil. The oil which is recovered at this stage in the process is of exceptionally high quality and has good color and excellent aroma.

When it is desired to recover further quantities of a somewhat lower quality oil, I pass the pulp from the press 20 through a steam still indicated at 25 for the recovery of distilled oil.

The amount of lime necessary in my process will depend to a considerable extent upon the source material being treated and the maturity of this source material. For example, I have found that in general with oranges the amount of lime necessary to give a good firming of the peel will vary from about 0.3% to about 1.5%, based on the weight of the half-shells entering the storage bin. It is, of course, obvious that the lime may be mixed with water and added to the storage bin as a suspension, either before or after the half-shells enter the bin.

After the lime has reacted with the peel, as evidenced by a hardened feel when the half-shell is squeezed in the hand, the lime solution may be drained from the storage bin 15 through the outlet 17. This slurry may be discarded or reused as desired. Furthermore, the liquid separated from the oil at the centrifuge 24 may be reused in the storage bin 15 or at the press 20, or may be run to the still to recover oil, although I have usually found it more advantageous to discard this liquid.

In connection with the utilization of the process herein disclosed I wish to describe a very practical commercial operation. This operation varies in no essential fundamental from the actual process described elsewhere but is useful for illustration of one of the various possible applications of that process, and is indicated in Figure 2.

The peel, prior to pressing, is stored in tanks 33. These tanks are filled by a conveyor 32 served by an elevator 31. This elevator rests at its bottom end in a pit 30 wherein is maintained a slurry of lime. Peel is dumped from trucks directly into the pit 30 where it is immediately covered by the lime slurry. The action of the elevator in agitating the contents of the pit is effective in maintaining the lime in suspension, and each portion of the peel is in contact with the lime slurry for a short period of time.

As the peel is raised in the elevator most of the slurry drains off and the moistened peel is stored in the tanks 33 for approximately six hours for reaction of the lime with the slimy constituents of the peel. Thus, while the peel is in contact with the lime slurry only for a time approximating ten seconds, lime adheres to the peel and the reaction between it and the peel continues for the full length of time between unloading and pressing. After reaction is complete, the peel passes to presses 34.

The amount of lime which must be kept in suspension in the liming pit at the foot of the elevator must, of course, be sufficient to give proper hardening of the peel. On the other hand it is inadvisable to maintain an excess quantity of lime since this may result in a very considerable waste. I have found it advisable to maintain between approximately 2% and 4% lime in the water of the lime pit. These percentages are maintained by adding water and lime to the pit as the slurry is exhausted by the entering peel. Percentages of lime based on the amount of peel are disclosed above.

As indicated above, the peel may be left in the tanks 33 for a specified time or a satisfactory hardening can be determined by the feel of the half-shell when squeezed in the hand. It is at this time that the half-shells will be conveyed to the press 34. The oily liquor may be passed to a centrifuge, and the peel may go to a stream still for recovery of distilled oil.

When processing ripe citrus fruit, as, for example, oranges, I have found it desirable to allow the half-shells to be in contact with the lime slurry for a period of from about 3 to 9 hours. It is to be understood, however, that the time necesssary may vary between somewhat wider limits than those above set forth and that it is only necessary to allow such time of contact with the lime slurry as is necessary to produce the hardened feel above mentioned.

I have found that when citrus half-shells, for example, are treated without the addition of lime but in all other respects in accordance with the above disclosure, the oil recovery usually runs about 1 to 3 pounds per ton of half-shells. On the other hand, from the half-shells which have undergone the lime treatment in accordance with the above disclosure, a recovery of approximately 8 to 12 pounds per ton of half shells is obtained. The practical importance of this result is obvious when it is considered that it is very little more expensive to operate the process hereinabove disclosed, whereas the amount of oil recovered may be several hundred per cent greater than that recovered by the same process which does not involve the use of an alkalizing material, such as lime.

In a further embodiment of my invention, I may start with a pulp obtained from citrus fruit or other essential oil containing material. Under these circumstances the pulp which may be made by grinding or otherwise comminuting the whole fruit or other material is intimately mixed with lime and conveyed to a storage bin where it is allowed to remain until suitable conversion of the pectic and other carbohydrate-like materials has occurred. The amount of lime necessary will be greater for comminuted whole fruit due to the acid content which is to be neutralized. An evidence of this reaction is that this conversion of the pectic and other carbohydrate-like materials greatly decreases the water-holding capacity of the material, thereby allowing considerable liquid to be drained or pressed from the treated pulp. The liquid which drains from the treated pulp during storage carries considerable amounts of the essential oil originally present in the pulp. This oil-carrying liquid may be conveyed to a centrifuge for the separation of the oil. After suitable conversion of the pulp has taken place, this being evidenced as described above, the pulp is conveyed to a dewatering press, where further separation of oily liquid from the pulp occurs. The liquid residue from the dewatering press is directed to the centrifuge for separation of the oil.

My method is not limited to the use of any particular type of apparatus, neither is it limited to the particular operating conditions suggested, since these are capable of variation within comparatively wide limits.

It is to be noted that it may be desirable to use other alkaline earth salts, such as salts of strontium or barium. Magnesium compounds, as oxide and hydroxide, may also be used to advantage. The examples given above recite the use of lime as the alkalizing agent. However, it is to be understood that the invention is not limited to the use of lime or to calcium compounds, but may be also practiced by the use of other metal hydroxides or compounds, such as potassium or sodium carbonate, as well as sodium bicarbonate. Ammonium hydroxide and carbonate may be used, though these are not the preferred compounds. An effective manner of hardening the material is to use together an alkaline earth salt and an alkali, for example, calcium chloride and ammonium hydroxide. In the claims the term "basic calcium compound" is intended to define those compounds which, when added to the pectinous material in suitable systems, tend to increase the pH.

It is to be further understood that there are many modifications of this invention which will now become apparent to those skilled in the art. I do not, therefore, desire to be limited by the specific examples given hereinabove, since all such changes and modifications as come within the scope of the appended claims are intended to be embraced thereby.

This application is a continuation-in-part of my co-pending application Serial No. 366,497, filed November 20, 1940.

Having thus described my invention in such full, clear, and concise language as to enable others skilled in the art to use the same, I claim as my invention and desire to secure by Letters Patent:

1. The process comprising hardening citrus peel with a material of the group consisting of $Ca(OH)_2$, $CaO$, $CaCO_3$, $SrO$, $Sr(OH)_2$, $SrCO_3$, $NaHCO_3$, $Na_2CO_3$, $K_2CO_3$, $Ba(OH)_2$, $BaO$, $NH_4OH$, $(NH_4)_2CO_3$, $MgO$, and $Mg(OH)_2$, pressing the hardened peel, and separating oil from the press liquor.

2. A process for obtaining orange oil comprising separating the juice and peel of oranges, hardening the peel with an aqueous slurry of a basic calcium compound, pressing the treated peel, and separating oil from the liquor so obtained.

3. A process for recovering oil from citrus fruit which comprises halving said fruit, burring out the juice, adding 0.3 to 1.5% lime to the peel, holding the limed peel for 3 to 9 hours, pressing the peel, and separating oil from the press effluent.

4. A process for recovering citrus oil comprising separating the peel and juice of the citrus fruit, reacting the peel with 0.3 to 1.5% by weight of calcium hydroxide for 3 to 9 hours, pressing the treated peel, and separating oil from the liquor pressed from the peel.

5. A process for recovering citrus oil comprising hardening citrus pulp with calcium hydroxide, thereafter pressing the hardened pulp, and separating oil from the press liquor.

6. The process for obtaining citrus oil from citrus wastes comprising hardening the citrus waste with a basic calcium compound, pressing the hardened waste, and thereafter separating oil from the liquor obtained from the hardened wastes.

7. A process for obtaining essential oil from a pectinous source material comprising hardening the source material with a compound of the group consisting of $Ca(OH)_2$, $CaO$, $CaCO_3$, $SrO$, $Sr(OH)_2$, $SrCO_3$, $NaHCO_3$, $Na_2CO_3$, $K_2CO_3$, $BaOH_2$, $BaO$, $NH_4OH$, $(NH_4)_2CO_3$, $MgO$, and $Mg(OH)_2$, pressing the hardened material, and separating essential oil from the liquor obtained from the hardened source material.

8. A process for obtaining essential oil from pectinous source materials comprising hardening the source material with an alkali in the presence of an alkaline earth ion, pressing the hardened material, and thereafter separating oil from the liquor obtained from the hardened material.

9. A process for obtaining essential oil from citrus fruit source materials comprising hardening the source material with an alkali in the presence of an alkaline earth ion, pressing the hardened citrus fruit source material, and thereafter separating oil from the press liquor.

JAMES A. FINLEY.